(12) United States Patent
Madala et al.

(10) Patent No.: US 11,695,475 B2
(45) Date of Patent: Jul. 4, 2023

(54) SYSTEMS AND METHODS FOR PERFORMING SELF- DIAGNOSTIC OPTICS TROUBLESHOOTING TECHNIQUES

(71) Applicant: VIAVI SOLUTIONS INC., San Jose, CA (US)

(72) Inventors: Sunitha VeerendraKumar Madala, Germantown, MD (US); Michael Scott Koller, Gaithersburg, MD (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/235,711

(22) Filed: Apr. 20, 2021

(65) Prior Publication Data

US 2021/0242938 A1 Aug. 5, 2021

Related U.S. Application Data

(63) Continuation of application No. 16/423,926, filed on May 28, 2019, now Pat. No. 11,005,563.

(51) Int. Cl.
*H04B 10/07* (2013.01)
*H04B 17/00* (2015.01)
*H04B 10/079* (2013.01)
*H04B 10/40* (2013.01)

(52) U.S. Cl.
CPC . *H04B 10/07953* (2013.01); *H04B 10/07955* (2013.01); *H04B 10/40* (2013.01)

(58) Field of Classification Search
CPC ........ H04B 10/07953; H04B 10/07955; H04B 10/40
See application file for complete search history.

(56) References Cited

U.S. PATENT DOCUMENTS

| 8,170,829 B1 | 5/2012 | Achkir et al. |
| 2008/0145059 A1* | 6/2008 | Dolfi ................... H04B 10/0731 398/135 |
| 2008/0226288 A1* | 9/2008 | Miller .................. H04B 10/073 398/9 |

(Continued)

OTHER PUBLICATIONS

Viavi, "Viavi TBERD,MTS-A 6000A to 8000 CSAM Specifications", Feb. 27, 2017, Viavi Solutions, pp. 33-36 (Year: 2017).*

(Continued)

*Primary Examiner* — Pranesh K Barua
(74) *Attorney, Agent, or Firm* — Mannava & Kang, P.C.

(57) ABSTRACT

A test instrument for providing an optics troubleshooting technique of an optical transceiver is disclosed. The test instrument may comprise a processor and a memory, which when executed by the processor, performs the optics troubleshooting technique. The optics troubleshooting technique may include identifying a test signal from the optical transceiver. The optics troubleshooting technique may include determining signal power associated with the signal. The optics troubleshooting technique may further include applying one or more expert mode settings. In some examples, the one or more expert mode settings may be applied in a predefined order until an acceptable BER result is achieved over a predefined test period. In this way, test instrument may determine which of the one or more expert mode settings is responsible for the acceptable BER result.

18 Claims, 11 Drawing Sheets

(56) References Cited

U.S. PATENT DOCUMENTS

| | | | |
|---|---|---|---|
| 2012/0076502 A1* | 3/2012 | Swanson | H04B 10/0795 |
| | | | 398/136 |
| 2016/0142146 A1* | 5/2016 | Iizuka | H04B 10/40 |
| | | | 398/115 |
| 2018/0076925 A1* | 3/2018 | Neal | H04L 1/0041 |
| 2019/0140738 A1 | 5/2019 | Zeng et al. | |

OTHER PUBLICATIONS

Viavi, "Viavi TBERD,MTS-A 6000A to 8000 CSAM Compact, unparalleled network testing versatility", Aug. 12, 2016, Viavi Solutions, All pages (Year: 2016).*

Viavi, "Viavi TBERD,MTS-A 6000A to 8000 CSAM Specifications", Feb. 27, 2017, Viavi Solutions, pp. 33-36, (4 pages).

Viavi, "Viavi TBERD,MTS-A 6000A to 8000 CSAM Compact, unparalleled network testing versatility", Aug. 12, 2016, Viavi Solutions, (4 pages).

* cited by examiner

| Results Overview | Optical Power (dBm) | DDM |
|---|---|---|
| Rx Level Lambda #1: | | 2.1 |
| Rx Level Lambda #2: | | 2.1 |
| Rx Level Lambda #3: | | 2.6 |
| Rx Level Lambda #4: | | 2.3 |
| Rx Level Sum: | | 8.3 |
| Tx Level Lambda #1: | | 2.1 |
| Tx Level Lambda #2: | | 2.1 |
| Tx Level Lambda #3: | | 2.4 |

330G

| Results Overview | Optical Power (dBm) | DDM |
|---|---|---|
| Module Temperature (C): | | 37 |
| Laser Bias Current (mA): | | 40.466 |

340G

| CFP4 | CFP4 Expert | QSFP | QSFP Expert | MDIO | I2C |
|---|---|---|---|---|---|

| | |
|---|---|
| Nominal Wavelength (nm) | 1302 |
| Vendor | Pluggable Optics Corp. |
| Vendor PN | PN012345-XXX |
| Vendor SN | SN543210-XXX |
| Vendor Rev | A0 |
| Date Code | 180811 |
| Lot Code | |
| Connector Type | LC |
| Max Link Length | 10km SMF |
| Transceiver | |
| Rx Power Level Type | Average Power |
| Rx Max Lambda Power (dBm) | 5.5000 |
| Tx Max Lambda Power (dBm) | 7.5000 |
| Nominal Bit Rate (Mbits/sec) | 28,000 |
| Power Class | <= 3.5 W |
| Module ID | QSFP28 |
| Diagnostic Byte | 12 |
| Rev Compliance | SFF-8636 rev 2.5-7 |
| Cable Length | --- |
| | 100GBASE-LR4 |

SYSTEMS AND METHODS FOR PERFORMING SELF- DIAGNOSTIC OPTICS TROUBLESHOOTING TECHNIQUES

PRIORITY

This application is a Continuation of commonly assigned and co-pending U.S. patent application Ser. No. 16/423,926, filed May 28, 2019, the disclosures of which are hereby incorporated by reference in their entirety.

TECHNICAL FIELD

This patent application is directed to optical and cable measurements in telecommunication networks, and more specifically, to systems and methods for performing self-diagnostic optics troubleshooting techniques for optical transceivers in telecommunication networks.

BACKGROUND

Data centers are expanding all over the world. One of the key trends is the growing importance and evolving landscape of fiber optic technologies enabling new architectures and enhanced levels of performance in data centers. As a result, fiber optics is no longer an optional technology, nor is it only reserved for the toughest interconnect problems. Bandwidth, port density, and low-power demands now require fiber optics. For example, 10G, 25G, 40G, 1000, 200G, and 400G fiber optic products, and beyond, are used to provision the highest bandwidth, highest density, lowest power, and lowest total cost interconnect solutions for optical telecommunications networks.

As fiber optic technologies continue to advance, testing fiber optic networks and/or products will be vital. That said, errors or inaccuracies may persist from time to time, and the reasons for some of these issues may be the result of suboptimal testing conditions or poorly managed test settings related to optical products, such as optical cables or optical (pluggable) transceivers. As a result, performing troubleshooting techniques that ensures quality of fiber optics service, especially for fiber optic transceivers, may be important for continued provision of network services and enhanced fiber optic performance.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Multi-lane transceiver modules, each lane running at electrical speeds in excess of 10 Gbps may have presented several challenges to both vendors of optical transceivers, as well as equipment manufacturers designed to stress/test those transceivers. There are standards to address electrical signal compliance for a system that needs to host a transceiver module as well as the transceiver module itself—in terms of tuned electrical characteristics for the transmit and receive path to/from host; to/from transceiver. Any coupling mismatch in coupling the host and transceiver electrical data signals may result in bit error in excess of what is considered acceptable. As a result, the troubleshooting techniques described herein may address these and other concerns and help ensure continued optical performance and delivery.

Figure 1:
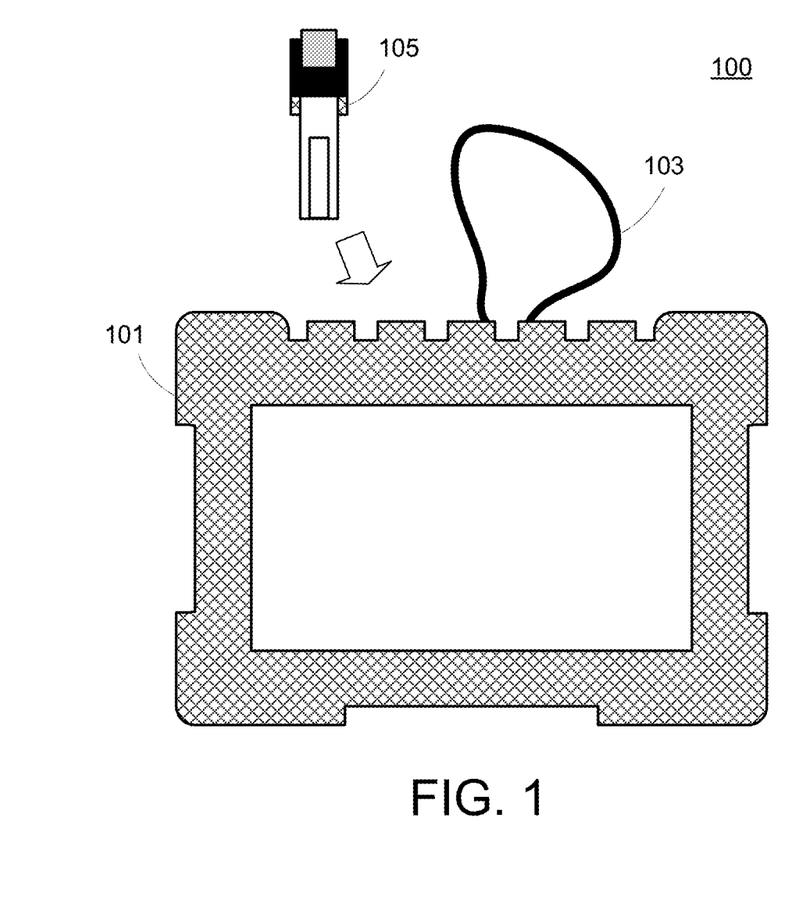
FIG. 1 illustrates a test instrument in a test environment, according to an example.

FIG. 1 illustrates a test instrument in a test environment 100, according to an example. The test environment 100 may include any number of telecommunication networks. As shown in FIG. 1, a test instrument 101 may perform any number of tests and measurements. In some examples, the test instrument 101 may perform tests and measurements on an optical cable 103 or an optical (pluggable) transceiver 105. The test instrument 101 may be able to perform network tests in the system environment 100 by generating, transmitting, and/or receiving high-speed signals.

As mentioned above, data centers may play a large role in various optical networks. In order for data centers to provide optical network services, any number of optical cables and/or optical (pluggable) transceivers may be used. Some optical transceivers may include, for example, but not limited to, 10G, 25G, 40G, 1000, 200G, and/or 400G optical transceivers, and beyond. These optical transceivers may be used in data centers and/or networks to support large transmission distances over single or multimode optical fibers. Furthermore, these optical transceivers may also increase density and reduce power consumption, all of which may be flexibly configured by any host system. Some of the leading optical transceivers may include the following:

CFP1/2/4: C Form Factor Pluggable;
QSFP+: Quad Small Form Factor with 4×N where N(max)~11G;
QSFP28: Quad Small Form Factor with 4×N where N(max)~28G;
QSFP56: Quad Small Form Factor with 4×N where N(max)~56G;
QSFP-DD: Quad small factor double density;
SFP+: Small Form Factor with 1 electrical lane with max rate~11G;
SFP28: Small Form Factor with 1 electrical lane with max rate~28G;
SFP56: Small Form Factor with 1 electrical lane with max rate~56G; and
SFP-DD: Small Form Factor double density.

When network test errors occur, troubleshooting techniques may be initiated for any number of these optical transceivers.

Among other things, the test instrument 101 of FIG. 1 may test network traffic 103, measure bit error rate (BER), and/or perform other various tests and measurements of device under tests (DUTs) to verify performance under severe or other conditions. If there are network test errors, however, the test instrument 101 may initiate a troubleshooting technique for the DUTs, as described in more detail herein, including testing any number of these optical transceivers or optical cables employed at a data center or elsewhere.

Figure 2:
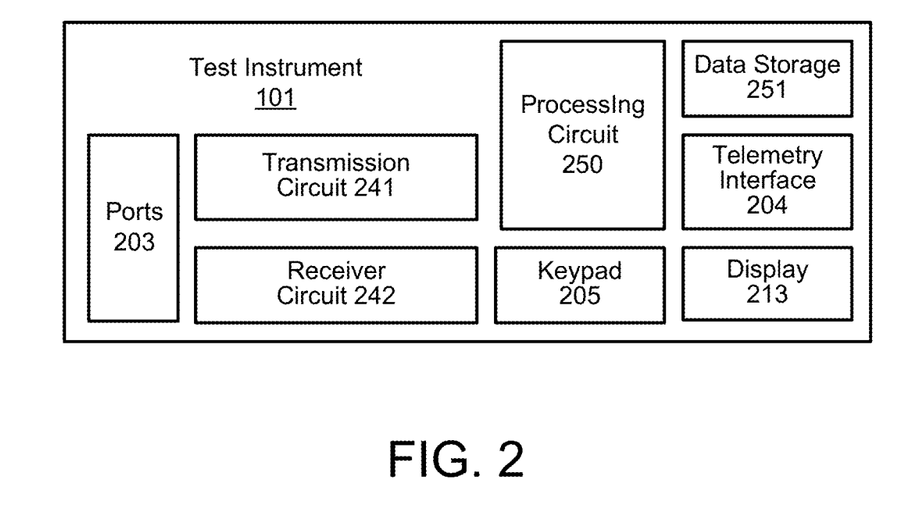
FIG. 2 illustrates a test instrument for performing a troubleshooting technique on an optical transceiver, according to an example.

FIG. 2 illustrates a test instrument 101 for testing optical networks and products, according to an example. The test instrument 101 may include a variety of components. The test instrument may be connected to a network (e.g., an optical network) at any desired test point (TP) to measure signals transmitted in the network. In some examples, this may include testing any number of optical transceivers. The test instrument 101 may include one or more ports 203. In some examples, the ports 203 may be used to connect to the test point (TP). It should be appreciated that these ports 203 may include an adapter interface to test an optical transceiver. In an example, the ports 203 may include coaxial RF cable connectors, as well as other non-cable ports, for example, to connect to a computer or to an external display, such as, but not exclusively, one or more USB ports, telephone, and the like.

The test instrument 101 may also include a telemetry interface 204 for connecting to a telemetry channel, such as a WiFi interface, Bluetooth interface, cellular interface or another network interface. The telemetry interface 204 may function as an additional communication channel. For example, the test instrument 101 may connect to any number of remote devices via the telemetry interface 204.

It should be appreciated that the test instrument 101 for copper impairment testing and remediation may include a user interface which may include a keypad 205 and display 213. The display 213 may include a touch screen display. A user may interact with the test instrument 101 via the user interface to enter information, select operations, view measurements, examine signal profiles, communicate with other devices, etc.

A data storage 251 may also be found in the test instrument 101. The data storage 251 may store any information used by the test instrument 101 and may include memory or another type of known data storage device. The data storage 251 may store data, power level measurements and/or any other measurements or data used by the test instrument. The data storage 251 may include a non-transitory computer readable medium storing machine-readable instructions executable by processing circuit 250 to perform operations of the test instrument 101.

A transmission circuit 241 may include a circuit for sending test signals into the network to perform various tests. The transmission circuit 241 may include encoders, modulators, and other known component for transmitting signals in the network. A receiver circuit 242 may include components for receiving signals from the network. The transmission circuit 241 and/or the receiver circuit 242 may also include other components, such as a demodulator, a decoder, an ADC, and/or other circuit components or elements.

A processing circuit 250 in the test instrument 101 may include any suitable hardware to perform the operations of the test instrument 101 described herein. The hardware of the test instrument 101, including the processing circuit 250, may include a hardware processor, microcontroller, a digital signal processor (DSP), an application specific integrated circuit (ASIC), a field programmable gate array (FPGA) or other programmable logic device, discrete gate or transistor logic, discrete hardware components, or any combination thereof designed to perform the functions and methods described herein. In an example, one or more of the functions and operations of the test instrument described herein may be performed by the processing circuit or other hardware executing machine readable instructions stored in a non-transitory computer readable medium, which may comprise RAM (random access memory), ROM (read only memory), EPROM (erasable, programmable ROM), EEPROM (electrically erasable, programmable ROM), hard drives, flash memory, or other types of storage devices, which may be volatile and/or nonvolatile. It should be appreciated that the test instrument 101 may also include components other than what is shown.

Various solutions have been implemented to identify anomalies and pairing mismatches between a host system and transceiver modules coupled to the system (usually via a pluggable connector). Some of these settings may be configured inside the transceiver itself and some may be configurations performed on the system hosting the transceiver. Configuring these settings appropriately may help ensure proper operation of these system components.

Configuring these settings, however, have become extremely challenging even for the most technical of users. Furthermore, configuring these settings may be cumbersome and time-consuming. Accordingly, the test instrument 101, among other things, may be used for performing tests for the optical network and/or optical products, such as optical (pluggable) transceiver, as described herein.

As mentioned above, the test instrument 101 may measure bit error rate (BER) performance, which when not configured properly may be a common reason for network test errors. It should be appreciated that BER performance may typically be based on at least three factors: data rate, confidence level, and BER threshold. In order to address potential network test errors associated with BER performance, the testing techniques described herein may adjust any number of settings or parameters associated with these factors.

Accordingly, the test instrument 101 may provide an automated approach to permute through various expert settings, one-by one, in a "smart" sequence. In other words, the test instrument 101 may adjust these expert mode settings, at least initially, based on most commonly used settings to fix issues, to least likely to be the setting that will fix the problem (based on historic experience, including technical support on field issues). This may allow a certain level of automation to converge more quickly on setting(s) needed to cleanup bit errors or reduce them to an acceptable BER (bit error rate).

It should also be appreciated that the test instrument 101 may use a pseudorandom binary sequence (PRBS) pattern to help evaluate optical transceiver performance. More details regarding these performance troubleshooting will be described below.

It should be appreciated that in addition to performance testing or performance troubleshooting, the test instrument 101 may perform various compliance tests, which may include testing and validating pattern sensitivity and crosstalk, stress dynamic skew, jitter, receiver sensitivity, stress communication bus with optics module (MDIO/I2C), etc. Having optimal test parameters and settings may increase testing efficiencies and minimize expense. Other various tests may also be performed by the test instrument 101.

In order for the test instrument 101 to identify network test errors (e.g., errors associated with BER performance), the test instrument 101 may initiate one or more troubleshooting techniques. This may start with testing an optical (pluggable) transceiver. In some examples, the troubleshooting techniques may include workflow tests with reporting features. These techniques may also include determining test times based on error rate theory.

In some examples, some optical transceivers may require adjustments to various settings or parameters. In this scenario, the test instrument 101 may automatically (or semi-automatically) run through one or more expert mode settings. In this way, the test instrument 101 may provide a more granulated way for diagnosing the optical transceiver or cables and potentially isolate problematic issues, which is highly important with high volume of cables and optics that exist in data centers. If optics or cables that do not perform to standard, they may simply be discarded, resulting in increases costs.

The test instrument 101 may implement a series of test sequences associated with expert mode settings to figure out what issues are causing the network test errors. For example, in a troubleshooting test, the test instrument may check for a signal and a power level. The signal may be a per lane signal, and the power level may be per lane power levels. If both of these are detected, then the troubleshooting test may go through a troubleshooting workflow and to test various expert mode settings in order to determine the reason (and correction) for the network test error. These may include adjusting the following expert mode settings: ignore loss/lack of signal (LOS), clock and data recovery (CDR) bypass at transmit/receive, high power mode, equalization values, or the like. Below is a table of expert signals, with a description, that may be configured as part of the troubleshooting technique for an optical transceiver.

TABLE 1

| EXPERT SETTINGS | |
|---|---|
| Setting | Description |
| Application Rate Select | SFP+/28 only - Controls TX/RX clock-retimers, especially critical in modules that support multiple line rates. Values are Auto, 00, 01, 10, 11. Auto = Software attempts to determine correct setting. |
| Receiver Equalization Auto | Controls adaptive (dynamic) equalization, typically used for passive modules. Values are Default, ON, OFF. Default = software attempts to turn on/off based on if it is able to detect if module is passive/active respectively. |
| Ignore LOS | Controls whether to ignore declaration of LOS by a module. Needed for modules that incorrectly declare LOS when LOS is actually absent. Values are YES, NO. Default is NO. |
| High Power Mode | A control that is part of a power lock-out feature, that prevents an inserted module from drawing more current than the host board can support. If the host board is able to support the power needed by an inserted module, enable High Power Mode instructs the module that it has permission to go into a higher power mode. Values are Auto, YES and NO. Auto means software enable/disables based on module's declared maximum power vs. host board power capability on the host port where module is installed. |
| TX CDR Bypass | This is similar to SFP+/28 application rate select, but just for TX side. But applies to QSFP+/28 and is controlled via I2C interface. Values are Default, ON, OFF, where Default = whatever value control is at when module first inserted. |
| RX CDR Bypass | This is similar to SFP+/28 application rate select, but just for RX side. But applies to QSFP+/28 and is controlled via I2C interface. Values are Default, ON, OFF, where Default = whatever value control is at when module first inserted. |

The troubleshooting technique may execute tests for each of these settings until one of them succeeds. The troubleshooting technique may also rollback the settings that did not work. The test instrument 101 may also collect data associated with these adjustments, generate a report, and output that report to show what settings worked. If none of the adjustments to these expert mode settings worked, then the report may indicate that, as well as the potential optics issues that resulted in the error(s).

It should be appreciated that the troubleshooting techniques applied by the test instrument 101 may be beneficial and helpful in isolating issues associated with optics or cables in a network, and to provide expert mode settings that may be applied to in order to get the optical transceivers and/or cables to function properly or effectively at a data center, a network, or the like. In other words, the troubleshooting techniques described herein may provide expert mode settings that may help improve the optics to be used on any number of device under test (DUT) or on any number of networks. Furthermore, the troubleshooting techniques described herein may provide useful information that may help identify potential issues with any number of optical transceivers so that a user can remedy the problems efficiently and expediently.

The troubleshooting techniques, as described herein, may be designed to evaluate the bit error rate (BER) and performance of a module (active or passive). This may also take place while exercising various expert features to optimize that performance. In order to expedite the troubleshooting techniques, attempts at optimization may occur in an order of most common problem areas (based on experience with field issues) and may progress to expert settings that are less likely to contribute unacceptable BER results. The troubleshooting techniques for optics/cable test may be intended to operate on any number of interfaces. For purposes of illustration, the troubleshooting techniques may operate following exemplary interfaces: (1) SFP+/28/56/DD; (2) QSFP+/28/56/DD; and (3) CFP1/2/4. Details for how the troubleshooting techniques may be used for each of these interfaces will be provided below.

For SFP+/28/56/DD, the expert mode settings (which may be applied in in the following order or other order) may be followed to help determine the network test error(s):
Ignore LOS=YES
Receiver Equalization Auto=ON
Receiver Equalization Auto=OFF
Application Rate Select=00
Application Rate Select=01
Application Rate Select=10
Application Rate Select=11

The following table may show the possible actions for the troubleshooting tests:

TABLE 2

| SFP+/28 | | |
|---|---|---|
| Ignore LOS | Rx EQ Auto | Rate Select |
| No | Default | Auto |
| Yes | Default | Auto |
| Yes | On | Auto |
| Yes | Off | Auto |
| Yes | Off | 00 |
| Yes | Off | 01 |
| Yes | Off | 10 |
| Yes | Off | 11 |

For QSFP+/28/56/DD, the expert mode settings (which may be applied in in the following order or other order) may be followed to help determine the network test error(s):
Ignore LOS=YES
High Power Mode=YES
Receiver Equalization Auto=ON
Receiver Equalization Auto=OFF
Transmitter CDR Bypass=Yes
Receiver CDR Bypass=Yes
Transmitter CDR Bypass=No The following table may show the possible actions for the troubleshooting tests:

TABLE 3

| QSFP+/28 | | | | |
|---|---|---|---|---|
| Ignore LOS | High Power | Rx EQ Auto | TX CDR Bypass | RX CDR Bypass |
| No | Auto | Default | Auto | Auto |
| Yes | Yes | Default | Auto | Auto |
| Yes | Yes | On | Auto | Auto |
| Yes | Yes | Off | Auto | Auto |
| Yes | | Off | Auto | |
| Yes | | Off | 00 | |
| Yes | | Off | 01 | |
| Yes | | Off | 10 | |
| Yes | | Off | 11 | |

For CFP1/2/4, the expert mode settings (which may be applied in in the following order or other order) may be followed to help determine the network test error(s):
Ignore LOS=YES
Receiver Equalization Auto=ON
Receiver Equalization Auto=OFF The following table may show the possible actions for the troubleshooting tests:

TABLE 4

| CFP4 | |
|---|---|
| Ignore LOS | Rx EQ Auto |
| No | Default |
| Yes | Default |
| Yes | On |
| Yes | Off |

It should be appreciated the type of modules encountered during the identification of the problem described above have been SFP+/28, QSFP+/28 and CFP1/2/4. However, the examples set forth should not be limited to only these components. The examples described herein may include transceiver form factors running at electrical clock speeds that stress the electrical limits of transmission/reception. These may include, but not limited to, the QSFP56, QSFP-DD, SFP56, SFP-DD, CFP8, OSFP, etc.

As described above, it may be possible to go through all the various permutations of expert mode settings at the expense of lengthening the time to troubleshoot. However, the troubleshooting techniques may not be required to do that to determine the network test error(s) and it may not be a realistic option for a field user who is limited on time. As a result, a key aspect of the troubleshooting techniques may be to first apply expert settings that are historically problematic and then moving on to lesser problematic areas. In some examples, the troubleshooting techniques may be executed as follows:

First, the troubleshooting technique may apply each expert setting (identified above) sequentially (for any specified optical transceiver) until it achieves an acceptable BER over a specified analysis time (as specified by user). Once such a BER is achieved, the troubleshooting technique may not assume that all accumulated expert settings are the necessary "recipe" to achieve acceptable BER.

To rule out applying unnecessary settings, when it achieves acceptable BER, the troubleshooting technique may roll back all but the most recently applied expert mode setting to see if that particular setting, by itself, alone—may be responsible for the BER improvement.

The troubleshooting technique may then perform a BER analysis with just the last expert setting, and if it still falls within acceptable BER boundaries, the user may be informed—via a report or display on a screen—that this single expert setting, by itself, may help them improve data performance of the optical transceiver under test.

If the performance test fails, the troubleshooting technique may assume that the cumulative expert settings are necessary to achieve acceptable BER. Again, it should be appreciated that while the troubleshooting technique may be configured to go through every single permutation of actual expert settings required to get optimal BER, this may not always necessarily be the most practical course of action because of the time it might take to perform such a task. Accordingly, in some examples, the troubleshooting technique to may go through actual expert settings based on a historical ranking to get optimal BER. If performing the test does not achieve an optimal BER, then the troubleshooting technique may indicate as such. Additionally and alternatively, in some examples, the troubleshooting technique may receive a user input that specifies how much time he or she may have to perform such a test. Based on this input, the troubleshooting technique may dynamically determine how much of the permutations it can go through in that that predefined or allotted time period to get optimal BER. Yet in other examples, the troubleshooting technique may dynamically determine how long it would take to go through all the expert setting permutations and provide a recommendation to the user. Ultimately, the troubleshooting technique may help isolate the network test error(s) in a manner that is customizable, comprehensive, and efficient.

Figure 3A:
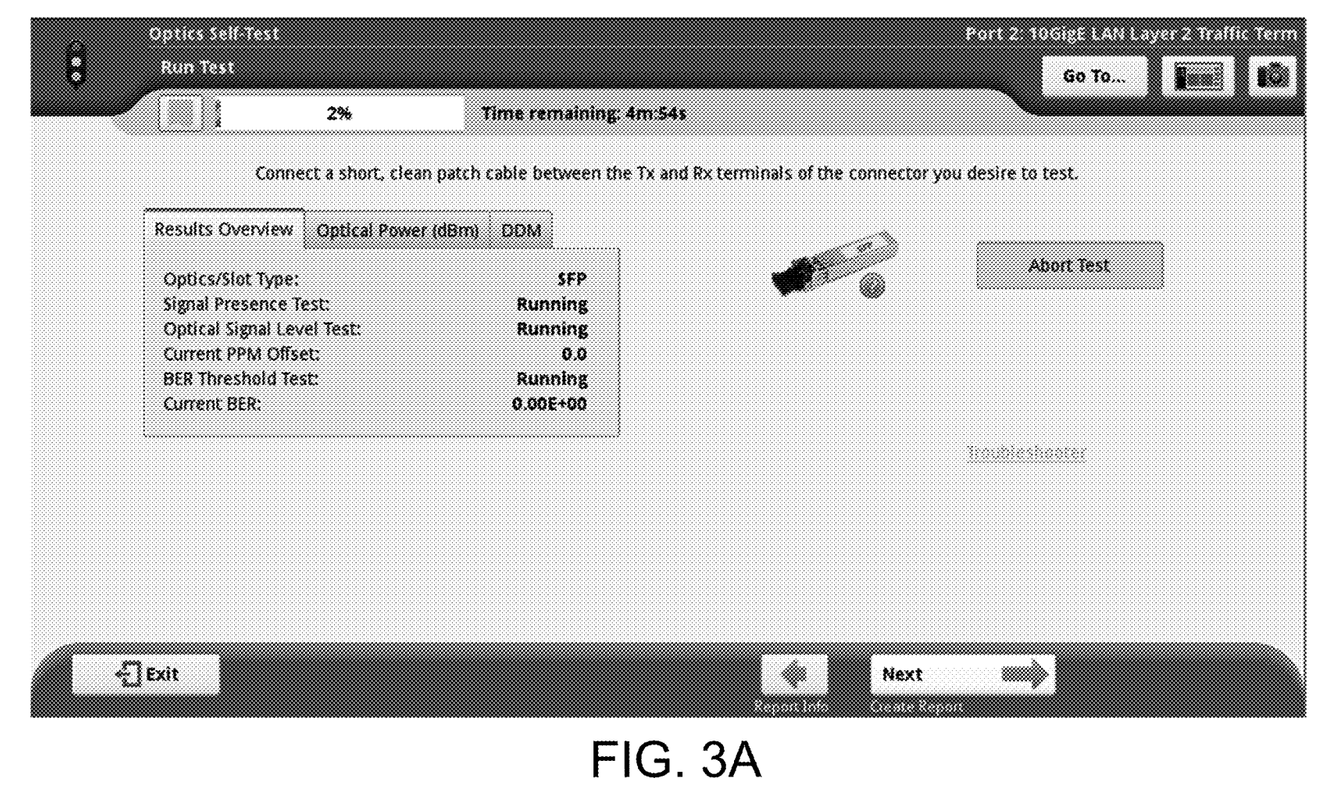
FIG. 3A-3H illustrate screens for performing a troubleshooting technique on an optical transceiver, according to an example.
Figure 3B:
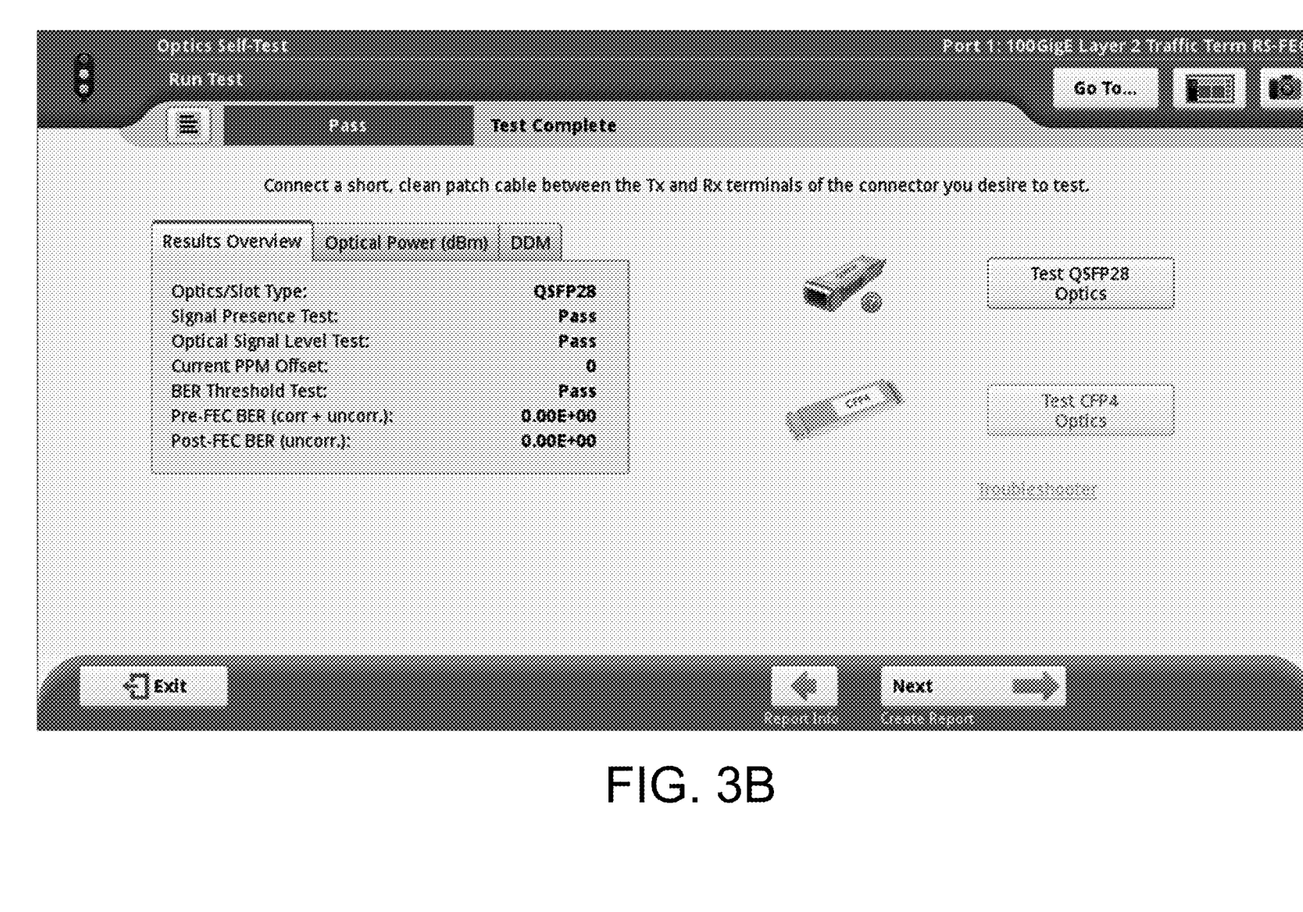
Figure 3C:
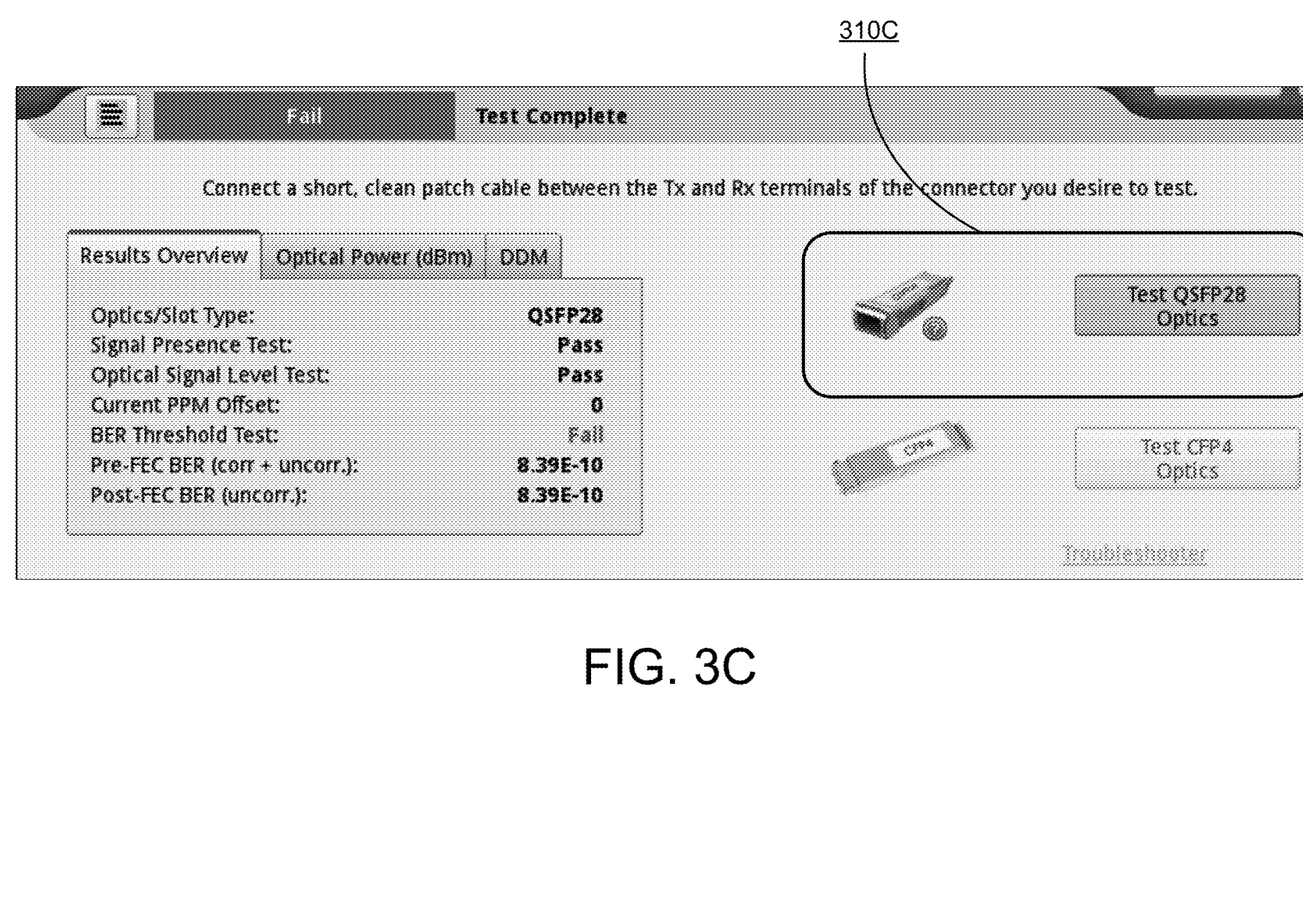

FIG. 3A-3H illustrate screens for performing a troubleshooting technique on an optical transceiver, according to an example. In FIG. 3A, an SFP-type optical transceiver may be tested. As shown, signal presence, signal level, current PPM offset, BER threshold, and current BER may be "running." An option to "abort" the test may also be provided. In FIG. 3B, a QSFP28 optical transceiver may be tested. As shown, signal presence, signal level, current PPM offset, BER threshold, current BER, pre-FEC BER, and post-FEC BER may have "passed" these various tests. In FIG. 3C, the QSFP28 may not have "passed" the BER threshold test, which may be indicated by a "fail" indicator. Accordingly, a troubleshooting option 310C may be selected to initiate the troubleshooting techniques described herein.

Figure 3D:
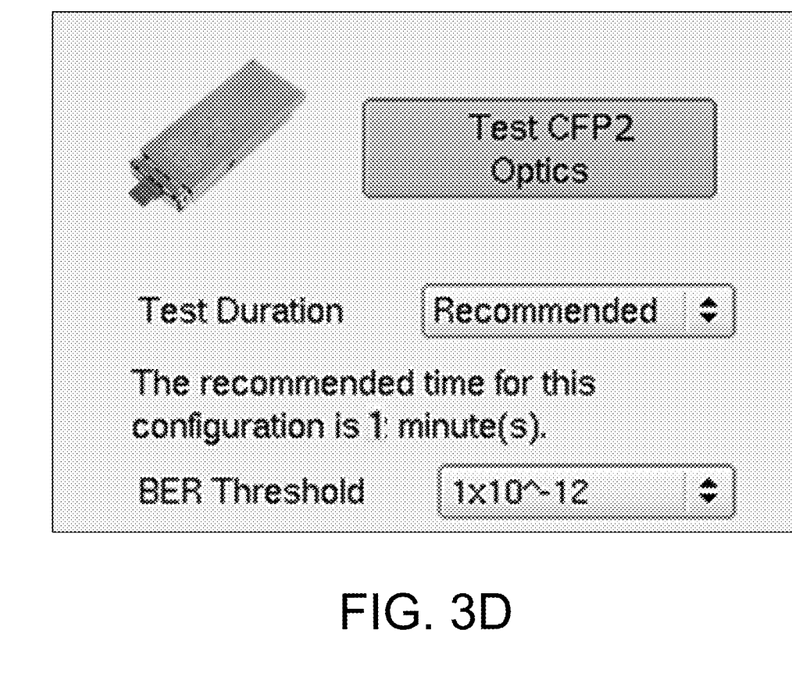
Figure 3E:
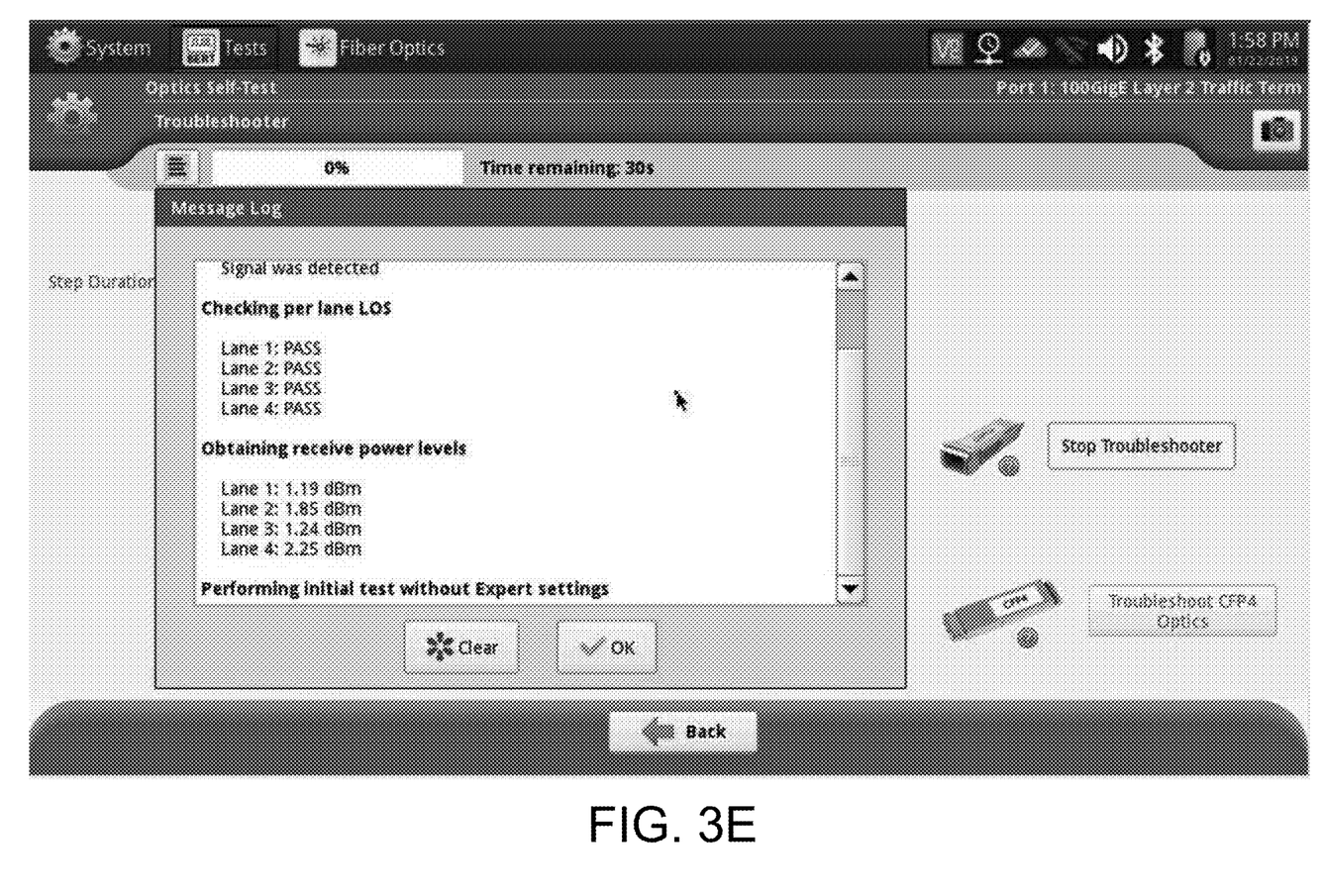
Figure 3F:
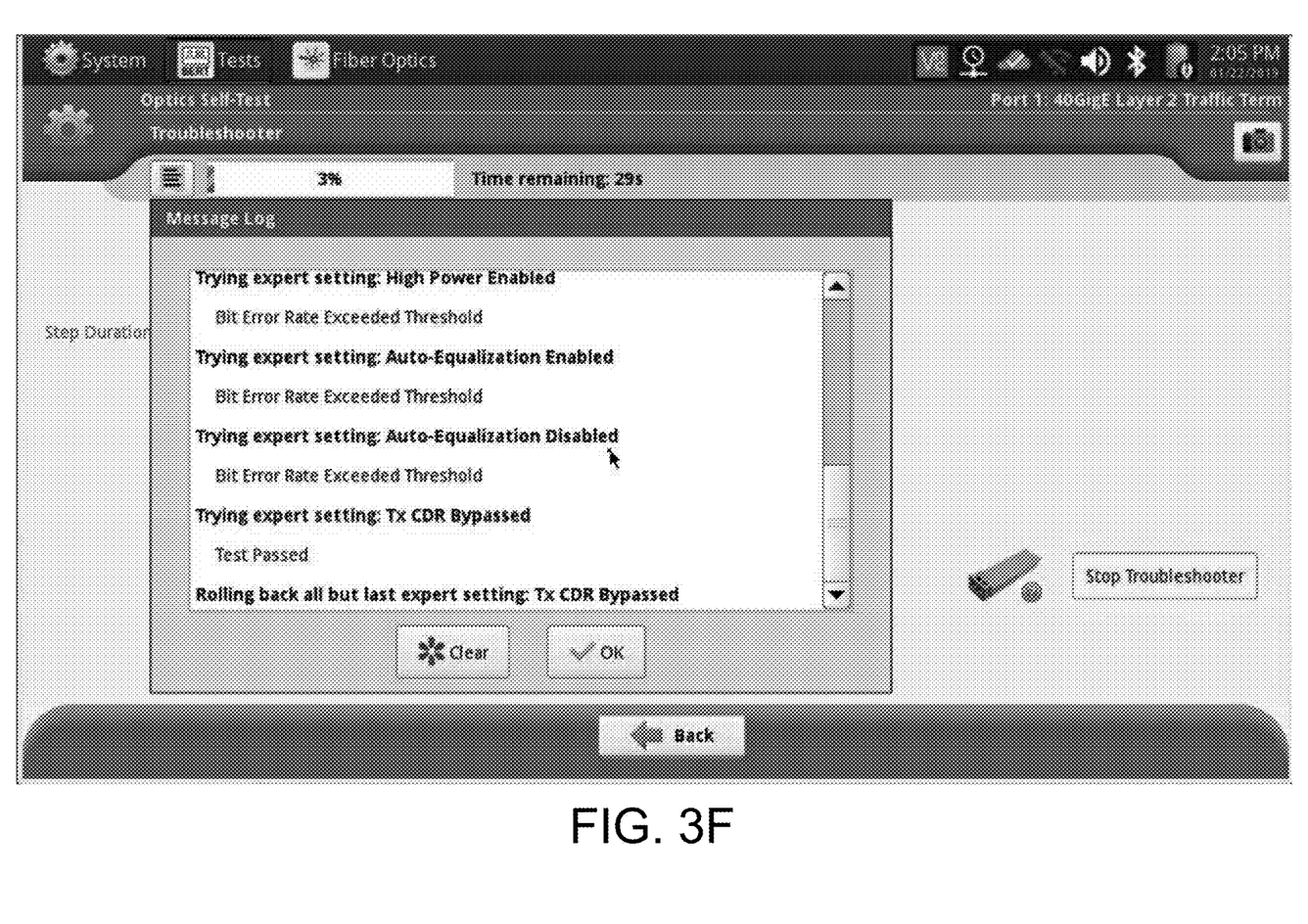

In FIG. 3D, details of the troubleshooting technique may be specified. For example, the test duration and BER threshold ($1 \times 10^{-12}$) may be specified. It should be appreciated that a recommendation for test duration may also be provided to help facilitate operations. In FIGS. 3E and 3F, the troubleshooting technique may perform the various expert setting tests in accordance with the order and/or details described herein. Real-time or near real-time processing steps may be shown and displayed to a user. In FIG. 3F, it may be seen that the last expert setting—Tx CDR Bypassed—may be rolled back. This may help the troubleshooting technique identify what setting may have caused the potential network test error.

Figure 3G:
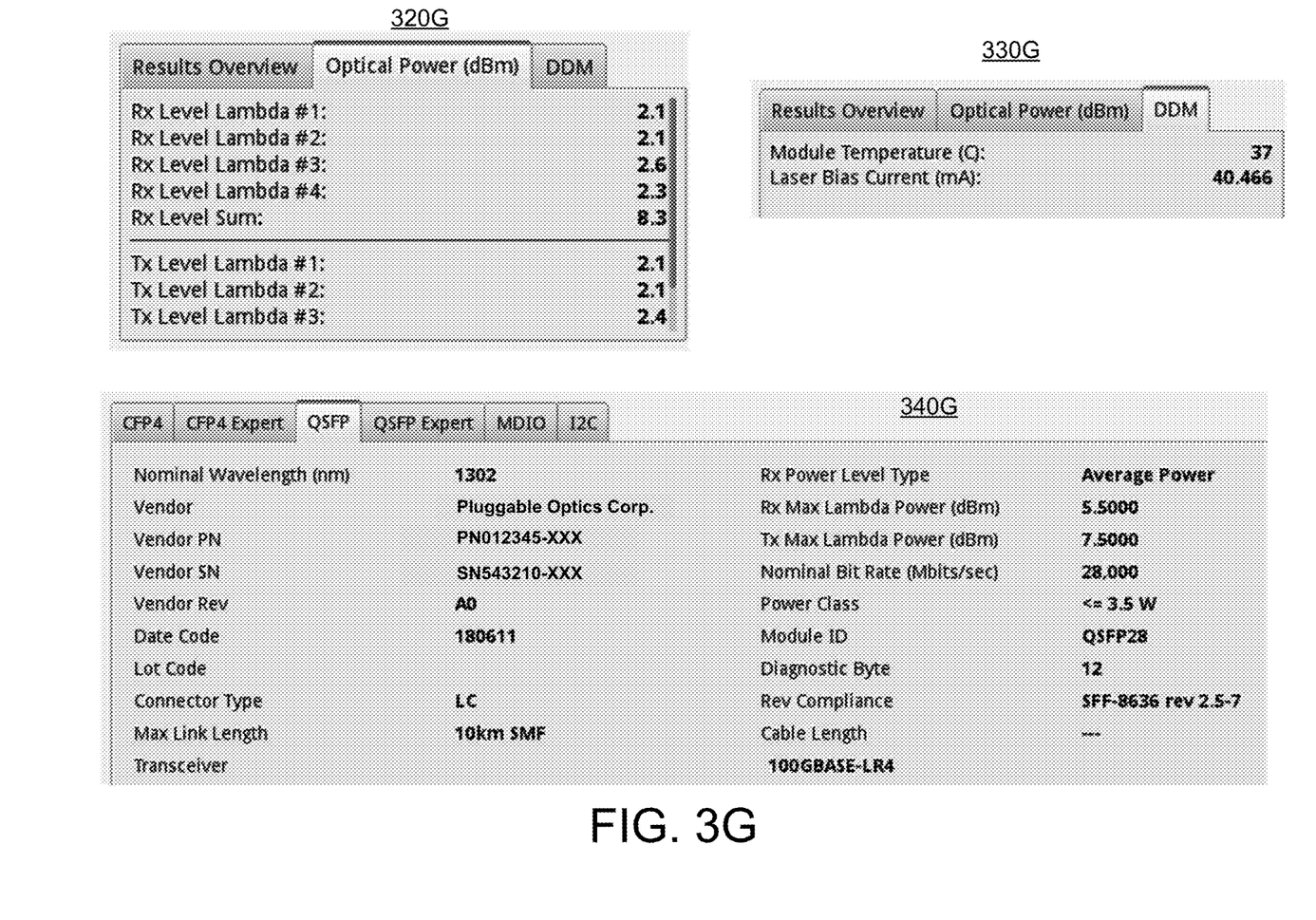
Figure 3H:
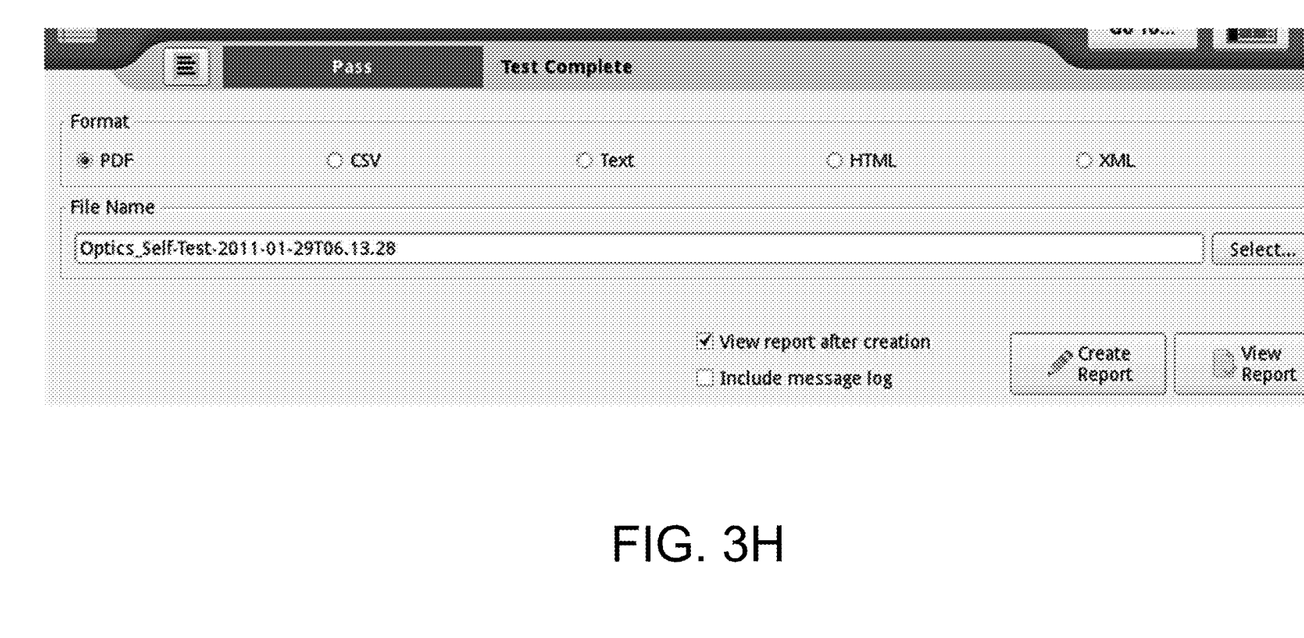

In FIG. 3G, the troubleshooting technique may be completed and various results may be displayed or presented. For example, the troubleshooting technique may present results of per lambda power 320G, DDM (Digital Diagnostic Monitor) information 330G, optical device information 340G, and/or other results or data. In FIG. 3H, there may be an option provided to the user to generate, view, and/or export a limited or full report of the troubleshooting test(s) performed. Other various capabilities and configurations may also be provided.

Figure 4:
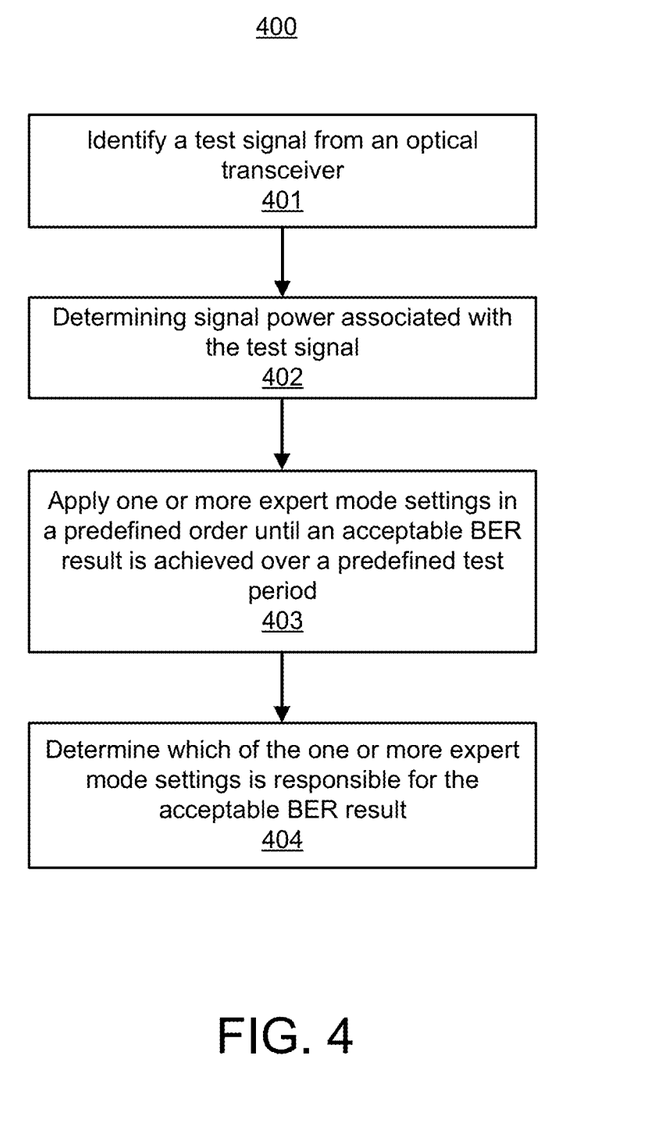
FIG. 4 illustrates a flow chart of a method performing a troubleshooting technique on an optical transceiver, according to an example.

FIG. 4 illustrates a flow chart of a method 400 performing a troubleshooting technique on an optical transceiver, according to an example. The method 400 is provided by way of example, as there may be a variety of ways to carry out the method described herein. Although the method 400 is primarily described as being performed by test device 100, the method 400 may be executed or otherwise performed by one or more processing components of the test device 100, or by another system or a combination of systems. Each block shown in FIG. 4 may further represent one or more processes, methods, or subroutines, and one or more of the blocks may include machine readable instructions stored on a non-transitory computer readable medium and executed by a processor or other type of processing circuit to perform one or more operations described herein.

At block 401, the test instrument 101, by the processing circuit 250, may generate a test signal. The signal may be based on a pseudorandom binary sequence (PRBS) pattern. The test instrument 101 may identify the test signal to/from an optical (pluggable) transceiver. As described herein, the optical transceiver may be pluggable to the test instrument via a port 203. The optical transceiver may be one of the following types: C Form Factor Pluggable (CFP/CFP2/CFP4), Quad Small Form Factor Pluggable (QSFP+/QSFP28+), Small Form Factor Pluggable (SFP+/SFP28), etc.

At block 402, the test instrument 101, via the processing circuit 250, may determine signal power associated with the test signal.

At block 403, the test instrument 101, via the processing circuit 250, may apply one or more expert mode settings in a predefined order until an acceptable BER result is achieved over a predefined test period. In some examples, as described herein, the expert mode settings may include ignore LOS (lack or loss of signal), application rate select; receiver equalization, CDR (clock and data recovery) bypass, high power mode, etc. The predefined order may be based on historical data associated with the optical transceiver or similar troubleshooting tests associated with the optical transceiver type stored in the memory. In some examples, the predefined order may be based on user input.

In some examples, the predefined test period may be based on user input, a system-generated recommendation based on historical data stored in the memory, or combination thereof. In some examples, the acceptable BER result may be based on user input, a system-generated BER result associated with the optical transceiver based on historical data stored in the memory, or combination thereof.

At block 404, the test instrument 101, via the processing circuit 250, may determine which of the one or more expert mode settings is responsible for the acceptable BER result. As described above, this may include performing a rollback technique of all the applied expert mode settings, except for the most recently applied expert mode setting, to determine one particular expert mode setting, by itself, is responsible for the acceptable BER result.

It should be appreciated that in some examples, the self-diagnostic optics troubleshooting technique performed by the processing circuit 250 may also generate and/or output a report. The report may be a partial or full report that presents results of the self-diagnostic optics troubleshooting technique. The results may be printed or displayed to a user via a display 213 on the test instrument 101.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A test instrument, comprising:
a port to be connected to an optical transceiver;
a processor; and
a memory storing instructions, which when executed by the processor, cause the processor to:
  detect a network error based on a bit error rate (BER) of a signal received from the optical transceiver;
  in response to detecting the network error, execute a troubleshooting technique on the optical transceiver to identify a potential cause of the network error, by setting the test instrument to each of a plurality of test settings in a predefined sequential order and executing tests on the optical transceiver, including measuring the BER of the optical transceiver, on each of the plurality of test settings in the predefined sequential order until acceptable BIER result is identified, wherein the BER result is acceptable when the measurement of the BER is higher than a BER threshold;
  in response to identifying the acceptable BER result, identify one of the plurality of test settings that is responsible for the acceptable BER result by applying a rollback technique on all of the plurality of test settings except for a most recent test setting on which the acceptable BER result was identified; and
  based on identifying one of the plurality of test settings that is responsible for the acceptable BER result, generate a report indicating the potential cause of the network error.

2. The test instrument of claim 1, wherein the signal received from the optical transceiver is based on a pseudorandom binary sequence (PRBS) pattern.

3. The test instrument of claim 1, wherein the optical transceiver is pluggable to the test instrument via the port, the optical transceiver comprising one of the following types: C Form Factor Pluggable (CFP1/CFP2/CFP4), Quad Small Form Factor Pluggable (QSFP+/QSFP28+/QSFP56/ QSFP-DD), and Small Form Factor Pluggable (SFP+/SFP28/SFP56/SFP-DD).

4. The test instrument of claim 1, wherein the plurality of test settings comprise a plurality of the following:
ignore LOS (lack or loss of signal);
application rate select;
receiver equalization;
CDR (clock and data recovery) bypass; and
high power mode.

5. The test instrument of claim 1, wherein the predefined sequential order of the plurality of test settings is determined based on historical data associated with the optical transceiver or troubleshooting tests associated with an optical transceiver type stored in the memory.

6. The test instrument of claim 1, wherein the predefined sequential order of the plurality of test settings is determined based on user input.

7. The test instrument of claim 1, wherein the predefined sequential order is determined based on historical ranking data of the plurality of test settings that provided optimal BER results stored in the memory.

8. The test instrument of claim 1, wherein the BER threshold is based on user input or historical data stored in the memory.

9. The test instrument of claim 1, wherein the troubleshooting technique is a self-diagnostic optics troubleshooting technique, and
wherein the report comprises results of the self-diagnostic optics troubleshooting technique and is displayed on a display screen.

10. A method for performing a troubleshooting technique on an optical transceiver, the method comprising:
detecting, by a processor of a test instrument, a network error based on a bit error rate (BER) of a signal received from the optical transceiver;
in response to detecting the network error, executing, by the processor of the test instrument, the troubleshooting technique on the optical transceiver to identify a potential cause of the network error, by setting the test instrument to each of a plurality of test settings in a predefined sequential order and executing tests on the optical transceiver, including measuring the BER of the optical transceiver, on each of the plurality of test settings in the predefined sequential order until an acceptable BER result is identified, wherein the BER result is acceptable when the measurement of the BER is higher than a BE threshold;
in response to identifying the acceptable BER result, identifying one of the plurality of test settings that is responsible for the acceptable BER result by applying a rollback technique on all of the plurality of test settings except for a most recent test setting on which the acceptable BER result was identified; and
in response to identifying one of the plurality of test settings that is responsible for the acceptable BER result, generating a report indicating the potential cause of the network error.

11. The method of claim 10, wherein the signal received from the optical transceiver is based on a pseudorandom binary sequence (PRBS) pattern.

12. The method of claim 10, wherein the optical transceiver is pluggable to the test instrument via a port, the optical transceiver comprising one of the following types: C Form Factor Pluggable (CFP1/CFP2/CFP4), Quad Small Form Factor Pluggable (QSFP+/QSFP28+/QSFP56/QSFP-DD); and Small Form Factor Pluggable (SFP+/SFP28/SFP56/SFP-DD).

13. The method of claim 10, wherein the plurality of test settings comprise a plurality of the following:
ignore LOS (lack or loss of signal);
application rate select;
receiver equalization;
CDR (clock and data recovery) bypass; and
high power mode.

14. The method of claim 10, wherein the predefined sequential order is determined based on at least one of: historical data associated with the optical transceiver, troubleshooting tests associated with an optical transceiver type, and user input.

15. The method of claim 10, wherein the predefined sequential order is determined based on based on historical ranking data of the plurality of test settings that provided optical BER results.

16. The method of claim 10, wherein the BER threshold is based on user input or historical data stored in a memory.

17. The method of claim 10, wherein the troubleshooting technique is a self-diagnostic optics troubleshooting technique, and
wherein the report comprises results of the self-diagnostic optics troubleshooting technique and is displayed on a display screen.

18. A non-transitory computer-readable storage medium in a test instrument storing instructions, which when executed by a processor, cause the processor to:
detect, at a test instrument, a network error based on a bit error rate (BER) of a signal received from an optical transceiver, wherein the optical transceiver is connected to a port of the test instrument;
in response to detecting the network error, execute, at the test instrument, a troubleshooting technique on the optical transceiver to identify a potential cause of the network error, by setting the test instrument to each of a plurality of test settings in a predefined sequential order and executing tests on the optical transceiver, including measuring the BER of the optical transceiver, on each of the plurality of test settings in the predefined sequential order until an acceptable BER result is identified, wherein the BER result is acceptable when the measurement of the BER is higher than a BER threshold;
in response to determining the acceptable BER result, identify one of the plurality of test settings that is responsible for the acceptable BER result by applying a rollback technique on all of the plurality of test settings except for a most recent test setting on which the acceptable BER result was identified; and
in response to identifying one of the plurality of test settings that is responsible for the acceptable BER result, generate a report identifying the potential cause of the network error.

* * * * *